(12) United States Patent
Yokoyama

(10) Patent No.: US 6,583,699 B2
(45) Date of Patent: Jun. 24, 2003

(54) MAGNETIC MATERIAL AND INDUCTOR

(75) Inventor: Ryo Yokoyama, Tokyo (JP)

(73) Assignee: TDK Corporation, Tokyo (JP)

( * ) Notice: Subject to any disclaimer, the term of this patent is extended or adjusted under 35 U.S.C. 154(b) by 43 days.

(21) Appl. No.: 09/984,208

(22) Filed: Oct. 29, 2001

(65) Prior Publication Data

US 2002/0158737 A1 Oct. 31, 2002

(30) Foreign Application Priority Data

Oct. 31, 2000 (JP) ........................................ 2000-331632

(51) Int. Cl.⁷ ............................. H01F 27/02; C04B 35/26
(52) U.S. Cl. ...................... 336/83; 336/215; 252/62.62; 252/62.63
(58) Field of Search .......................... 336/83, 215, 212; 333/185; 252/62.62, 62.58, 62.59, 62.63, 62.64

(56) References Cited

U.S. PATENT DOCUMENTS

| | | |
|---|---|---|
| 5,346,638 A | 9/1994 | Kodama et al. |
| 5,711,893 A * | 1/1998 | Park ........................ 252/62.62 |
| 6,033,594 A | 3/2000 | Enokido et al. |
| 6,183,659 B1 * | 2/2001 | Murayama et al. ...... 252/62.62 |
| 6,217,790 B1 * | 4/2001 | Onizuka et al. ......... 252/62.63 |

FOREIGN PATENT DOCUMENTS

| | | | |
|---|---|---|---|
| EP | 0 891 955 | | 1/1999 |
| JP | 59-121155 | | 7/1984 |
| JP | 59-121156 | | 7/1984 |
| JP | 59-121803 | | 7/1984 |
| JP | 59-121804 | | 7/1984 |
| JP | 59-121806 | | 7/1984 |
| JP | 01009863 A | * | 1/1989 |
| JP | 1-179402 | | 7/1989 |
| JP | 0121234 A | * | 8/1989 |
| JP | 3-91209 | | 4/1991 |
| JP | 3-93667 | | 4/1991 |
| JP | 8-51011 | | 2/1996 |
| JP | 08151258 A | * | 6/1996 |
| JP | 11-87126 | | 3/1999 |

* cited by examiner

Primary Examiner—Anh Mai
(74) Attorney, Agent, or Firm—Oblon, Spivak, McClelland, Maier & Neustadt, P.C.

(57) ABSTRACT

A magnetic material includes main components having $Fe_2O_3$ of 46.0 to 51.0 mol %, CuO of 0.5 to 15.0 mol % and the rest being NiO. With respect to the main components of 100 wt parts, additives are added. The additives are bismuth oxide of 4.0 to 10.0 wt part in terms of $Bi_2O_3$, magnesium oxide of 1.0 to 5.0 wt part in terms of MgO, silicon oxide of 2.0 to 8.0 wt part in terms of $SiO_2$, and cobalt oxide of 0.2 to 0.5 wt part in terms of CoO. Further, an inductor has a core including the above magnetic material, and is composed by molding a resin.

8 Claims, 1 Drawing Sheet

MAGNETIC MATERIAL AND INDUCTOR

BACKGROUND OF THE INVENTION

1. Field of the Invention

The present invention relates to a magnetic material to be used as a core material of an inductance element and an inductor having the core using the magnetic material, and in particular to a ferrite to be suitably used as the core material of a chip inductor of a resin molded type and an inductor using the core.

2. Description of the Related Art

Generally a temperature characteristic of a permeability of the ferrite to be used to the inductance element has conventionally had a positive temperature coefficient. This is because since a capacitance of a condenser used in combination for composing the inductance element and a circuit has normally a negative temperature characteristic, a measure is taken in order that characteristics of the combined substances are changed as least as possible by change in temperature.

However, considering not a simple combination of the inductance element and the condenser, but the temperature coefficient in the whole of the circuit, since temperature coefficients of parts composing the circuit, other than the condenser, are positive, the inductor having a negative temperature coefficient about permeability is needed in order to lessen the temperature coefficient in the whole of the circuit, and such a ferrite has been demanded where the temperature coefficient of the permeability satisfying the need is negative.

On the other hand, recently, in fields of chip inductor, fixed coil and others of resin molded type which have rapidly spread and are used in televisions, video tape recorders or mobile communication machinery, in order to comply with demands concerning small size, light weight and high precision, requirements of narrow tolerance and high reliability with respect to these parts have increased. In elements of the resin molded type, since an inductance value is varied by compression stress caused by molding a resin, it is difficult to obtain parts of high quality having small tolerance of inductance. Therefore, such a ferrite has been demanded which is small in change of the inductance to an external stress, that is, good in an anti-stress characteristic.

Thus, in order to comply with these demands, a magnetic material having the negative temperature coefficient about the permeability and the good anti-stress characteristic will be necessary.

As the ferrite where the temperature coefficient of the permeability is negative, JP-A-59-121803, JP-A-59-121804, JP-A-59-121806, JP-A-59-121155 and JP-A-59-121156 respectively show the ferrite where the temperature coefficient of an initial permeability is similarly negative in range between 0 and 80° C. Further, examples of these publications show that densities of sintered compacts are heightened and are effective for improving strength of products. However, a problem about variances of the inductance when an external stress is effected cannot be settled.

On the other hand, JP-A-1-179402 refers to a core for inductor in which a ferrite material of oxide containing nickel as a necessary component is contained with at least one kind of 1.5 to 5 wt % of $Bi_2O_3$ and $V_2O_5$, whereby change of the inductance is small, though the external stress is fluctuated. However, the ferrite material of this composition cannot comply with the demand that the temperature coefficient of the permeability is made negative.

JP-A-3-93667 describes a high frequency magnetic material which has a spinel type composition of Fe₂O3 of 25 to 40 mol %, ZnO of 0 to 20 mol %, the rest being NiO and CuO, and a mol ratio of NiO being more than a mol ratio of CuO, containing, as components of small amount, $Bi_2O_3$ of 0.1 to 12 wt % and $SiO_2$ of 0.05 to 4.0 wt %, and which is small loss even if being above 1 MHz. Further, $Co_3O_4$ of 0.01 to 1.5 wt % or cobalt oxide or cobalt carbide of amounts being equivalent thereto is added to the above high frequency magnetic material as another example. An example of the same measures changes of inductance by applying pressure, and shows that the change of inductance is small to pressure. However, relative temperature coefficients of the initial permeability are both positive, and it is not possible to satisfy the demand that the temperature coefficient of the permeability is made negative.

JP-A-3-91209 sets forth a ferrite composition which is a spinel type composition of $Fe_2O_3$ of 25 to 40 mol %, ZnO of 0 to 20 mol %, the rest being NiO and CuO, and a mol ratio of NiO being more than a mol ratio of CuO, containing, as components of small amount, $Bi_2O_3$ of 0.1 to 5 wt % and $SiO_2$ of 0.05 to 4.0 wt %. However, the example shows only the composition where a basic composition of $Fe_2O_3$: 38.2 mol %, NiO: 50.3 mol %, ZnO: 8.4 mol % and CuO: 3.1 mol % is added with $Bi_2O_3$: 3 wt % and $SiO_2$: 0.8 wt %. With respect to this example, the change of inductance is measured by applying pressure, and the changing rate thereof is calculated. However, the calculated changing rate is not a rate of change exerted with a predetermined pressure but a value calculated from inductance before and after molting the resin. Therefore, it is not seen whether an inductance at pressure of, for example, 50 kPa is within ±5% or not. Further, a positive value is shown as to the temperature coefficient of inductance, and it is not possible to satisfy the demand that the temperature coefficient of the permeability is made negative.

Further, JP-A-11-87126 discloses that main components containing at least iron oxide and nickel oxide contain as additives one kind or two kinds or more bismuth oxide, vanadium oxide, phosphorus oxide and boron oxide, and are added with a first subcomponent and a second subcomponent. The ratios of the additives such as bismuth oxide to the main components are 0.5 to 15 wt %. The first subcomponent is silicon oxide, and the ratio to the main component is 0.1 to 10.0 wt %. The second subcomponent is one kind or two kinds or more of magnesium oxide, calcium oxide, barium oxide and strontium oxide, and the ratios to the main components are 0.1 to 10.0 wt %. In regard to this ferrite, the changing ratio of the inductance when applying pressure of 50 kPa is within ±5%, and the relative temperature coefficient of the initial permeability in the temperature range of −20 to 60° C. is ±20 ppm/° C. However, in examples of the same, the relative coefficients of the initial permeability are all positive, and it is not possible to satisfy the demand that the temperature coefficient of the permeability is made negative.

SUMMARY OF THE INVENTION

As mentioned above, there has never existed any magnetic material having the negative temperature coefficient about the initial permeability and the excellent anti-stress characteristic. Accordingly, it is an object of the invention to offer such a magnetic material where a relative temperature coefficient of an initial permeability is negative and an anti-stress characteristic is excellent. Another object of the invention is to offer a resin molded typed inductor having a negative temperature coefficient about inductance by use of this magnetic material and having a small tolerance of the inductance.

A magnetic material of a first aspect of the invention is characterized in that main components of 100 wt parts including $Fe_2O_3$ of 46.0 to 51.0 mol %, CuO of 0.5 to 15.0 mol % and the rest being NiO are added with additives of bismuth oxide of 4.0 to 10.0 wt part in terms of $Bi_2O_3$, magnesium oxide of 1.0 to 5.0 wt part in terms of MgO, silicon oxide of 2.0 to 8.0 wt part in terms of $SiO_2$, and cobalt oxide of 0.2 to 0.5 wt part in terms of CoO.

In the magnetic material of the first aspect, the relative temperature coefficient of the initial permeability is negative, and the excellent anti-stress characteristic can be realized. Accordingly, it is possible to actualize a resin molded type inductor having a negative temperature coefficient about inductance by use of the magnetic material and having a small tolerance of the inductance.

Herein, reasons for specifying the above mentioned composition are as follows. Of the main components, if $Fe_2O_3$ is less than 46.0 mol %, the density of a sintered compact goes down. The density of the sintered compact and a specific resistance as the core start to decline by precipitation of $Fe_3O_4$ during firing in the atmosphere from a range where $Fe_2O_3$ exceeds a stoichiometric composition. This precipitation is remarkably seen in a range where $Fe_2O_3$ exceeds 51.0 mol %.

If CuO is less than 0.5 mol %, a sintering property of ferrite is deteriorated, and the density of the sintered compact goes down. In contrast, being more than 15.0 mol %, the specific resistance of the core lowers, In the invention, NiO is contained as a reminder of the main components, and this is meant that various characteristics are adjusted by other components to create the reminder. If NiO is not contained, the specific resistance is decreased.

On the other hand, in the additives, as the bismuth oxide wets and spreads in grain boundaries, particularly the anti-stress characteristic is improved. If the bismuth oxide is much contained, an improving effect of temperature characteristic is also heightened. If the containing ratio of the bismuth oxide is less than 4.0 wt parts, the anti-stress characteristic is hardly improved, and the temperature characteristic having the negative temperature coefficient of the initial permeability is also deteriorated. If the containing ratio of the bismuth oxide is more than 10.0 wt parts, the characteristic is dispersed, it flows out from a substance under being sintered, adheres other cores and stains sintering instruments such as a setter.

In addition, by containing an additive of magnesium oxide, a temperature characteristic can be improved to be a temperature characteristic having the negative temperature coefficient of the initial permeability. If a ratio of magnesium oxide is less than 1.0 wt part, the improving effect of the temperature characteristic cannot be provided. In contrast, the composition ratio of the magnesium oxide exceeds 5.0 wt parts, the anti-stress characteristic is worsened.

Further, by containing silicon oxide in addition to magnesium oxide, the temperature characteristic and the anti-stress characteristic are more improved, and the improving effect is more conspicuous than a single addition of magnesium oxide. If the composition ratio of silicon oxide is less than 2.0 wt parts, the improving effect of the temperature characteristic is scarcely obtained. If the composition ratio of silicon oxide is more than 8.0 wt parts, the anti-stress characteristic is worsened.

In addition, by containing an additive of cobalt oxide, the above mentioned temperature characteristic can be improved, and Q value may be also heightened. If the composition ratio of cobalt oxide is less than 0.2 wt parts, the improving effect of the temperature characteristic is hardly obtained, and the Q value is not heightened, either. On the other hand, if the composition ratio of cobalt oxide exceeds 0.5 wt parts, the Q value goes up, but the temperature characteristic goes down.

The magnetic material of a second aspect of the invention is characterized in that, in the first aspect of the invention, the additives of magnesium oxide and silicon oxide are added 3.0 to 10.0 wt parts in terms of talc $[Mg_3Si_4O_{10}(OH)_2]$ to the main component of 100 parts.

In the magnetic material of the second aspect, magnesium oxide and silicon oxide are added as a talc simultaneously. By adding as the talc, the temperature characteristic having the negative temperature coefficient of the initial permeability with the small amount thereof may be obtained, and the anti-stress characteristic is improved. If the composition ratio of talc is less than 3.0 wt parts, the improving effect of the temperature characteristic is scarcely provided. On the other hand, the composition ratio exceeds 10.0 wt parts, the anti-stress characteristic is deteriorated.

The magnetic material of a third aspect, characterized in that, in the first or second aspect, the relative temperature coefficient of the initial permeability in a temperature range between −20 and 20° C. and a temperature range between 20 and 60° C. is negative.

With respect to the magnetic material of the invention, in the range of −20 to 60° C., the magnetic material is composed so that the temperature coefficient of the initial permeability becomes negative in the respective ranges of 20° C. or higher and 20° C. or lower. Therefore, the temperature coefficient of the initial permeability does not become negative in a part of the above ranges, and changes by temperature are avoided in such circuits where other electronic parts of a positive temperature coefficient are combined with.

The magnetic material of a fourth aspect, characterized in that, in any of the first to third aspect, the changing rate in inductance when pressing at pressure of 50 kPa is within ±5%.

The magnetic material of the fourth aspect can have a practically sufficient anti-stress characteristic in such a manner that the changing rate in inductance when pressing at pressure of 50 kPa is made within ±5%.

An inductor of a fifth aspect, characterized in that the inductor includes a core including the magnetic material as set forth in any of the first to fourth aspect, and the core is molded with a resin.

When applying the core including the magnetic material of the invention to the inductor molded with the resin, it is possible to actualize the resin molded type inductor having the negative temperature coefficient as to the inductance, the high anti-stress characteristic and the small inductance tolerance.

DETAILED DESCRIPTION OF THE PREFERRED EMBODIMENTS

Figure 1:
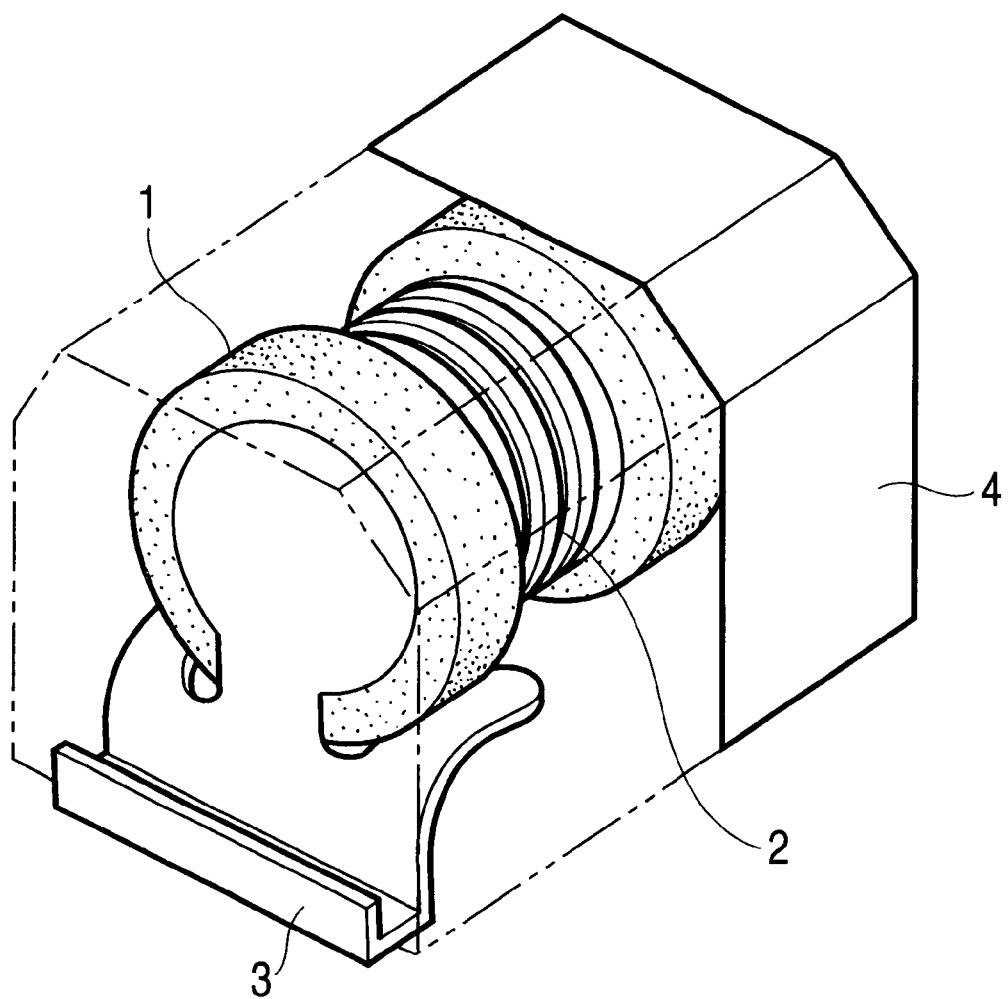
FIG. 1 is a partially transparent and perspective view showing one embodiment of the inductor of the invention.

The magnetic material according to the invention includes the above mentioned main components and additives, and is produced as follows. For the main components, used are iron oxide α-$Fe_2O_3$, nickel oxide NiO and copper oxide CuO.

For bismuth oxide, magnesium oxide, silicon oxide and cobalt oxide enumerated as the additives, it is possible to use various kinds of compounds which are changed into these oxides by firing, and preferably oxides, in particular the respective kinds of the above listed oxides are desirably used. Raw materials are mixed to be the above mentioned composition ratio as final compositions.

Subsequently, the mixture is calcined. Calcining may be ordinarily carried out in the atmosphere, and the calcining temperature is 800 to 1100° C., and the calcining temperature is preferably 1 to 3 hours.

Next, the obtained calcined material is pulverized until becoming predetermined sizes by use of such as a ball mill. After pulverizing the calcined material, a suitable binder as polyvinyl alcohol is appropriately added to form into predetermined shapes.

Subsequently, the formed material is fired. The firing may be ordinarily carried out in the atmosphere, and preferably the firing temperature is 900 to 1200° C., and the firing time is preferably 2 to 5 hours.

The ferrite of the invention is processed as a core of a predetermined shape, and after being coiled with a necessary wire, it is resin-molded, and used as a fixed inductor or a chip inductor to respective kinds of machinery such as televisions, video tape recorders, or mobile communication machinery, for example, cellular phones and car telephones. The shape of core is not especially limited, and drum shaped cores of outer diameter and length being both 2 mm or smaller (for example 1.8 mm×1.5 mm) may be enumerated.

The resin to be used as the molded material (shielded material) is not especially limited, and there are listed, for example, thermal plastic resin and thermal setting resin, and actually polyolefin resin, polyamide resin, polycarbonate resin, polyurethane resin, phenolic resin, urea resin, epoxy resin, polyester or the like. As means of molding the molded material, a dipping, coating or blowing may be used, and an injection molding or a casting molding may be used.

FIG. 1 is a partially transparent and perspective view showing a composing example of the chip inductor using the ferrite of the invention. This exemplified chip inductor uses the ferrite of the invention, and includes a drum typed core 1 having brims of large diameter at both ends, a wire 2 coiled on the barrel of the core 1, a terminal electrode 3 of connecting the end portion of the wire 2 to an external electric circuit and securing the core 1 within the resin (molded material), and the molded material 4 covering these members.

The structure of the chip inductor is not limited to the shown example, but various embodiments may be employed. For example, such a structure is sufficient that, for example, the lead wire is connected from the center part of the cylindrical shaft of the core to an axial direction. Further, such a structure is also enough that a coil blank provided with the wire or the lead wire on the core is inserted in a box shaped resin case, and an open part is sealed with the molded material.

EXAMPLES

Raw materials of the respective main components and raw materials of the additives were weighed to be the composition ratios shown in Table 1A and mixed for five hours in the ball mill. Incidentally, the composition ratios of the respective additives are in relation with 100 wt parts of the main components. Samples 1 to 7 are examples within the composition range of the invention, and samples 8 to 10 are comparative examples out of the composition range of the invention.

The mixture obtained as mentioned above was calcined at 900° C. for 2 hours in the atmosphere, mixed for 20 hours and pulverized in the ball mill. The mixture after pulverization was dried and added with polyvinyl alcohol of 1.0 wt %, and then formed at pressure of 100 kPa so as to obtain a square shape of dimension being 50 mm×10 mm×7 mm and a toroidal shape of 20 mm outer diameter, 10 mm inner diameter and 5 mm height. These formed bodies were fired in the atmosphere for 2 hours at temperatures shown in Table 1A so as to obtain square core samples and toroidal core samples, each including ferrite.

The square core samples were coiled 14 times with the wire on the center part and exerted with a uniaxial compression at constant speed, and the inductance values at this time were measured successively, and from the obtained measured values, the changing rates of the inductance were calculated. Table 1B shows the changing rates ΔL/L of the inductance when the uniaxial compression of 50 kPa was exerted. Herein, L is the inductance before applying pressure and ΔL is the changing amount of the inductance by applying pressure, that is, a value of the inductance at applying pressure minus the inductance before applying pressure.

Incidentally, the uniaxial pressure was performed by a load testing machine made by Aiko Engineering Inc. (Measuring Stand MODEL 1321, Measuring Amplifier MODEL 1011 CREEP and LOAD CELL MODEL 3800), and the inductance values were measured by Precision LCR meter 4284A made by Hewlett-Packard Company.

The wire was coiled 40 times on the toroidal core sample, and then the inductance values were measured by the LCR meter. The initial permeability ($\mu i$) at 100 kHz, and the relative temperature coefficient $\alpha\mu ir$ at −20 to 20° C. and 20 to 60° C. were calculated by an equation 1. In the equation 1, $T_1$ and $T_2$ are respectively temperatures measuring the permeability, $\mu i_1$ and $\mu i_2$ are respectively the initial permeability at the temperatures $T_1$ and $T_2$.

$$\alpha\mu ir = \frac{\mu i_2 - \mu i_1}{\mu i_1^2} \cdot \frac{1}{T_2 - T_1} \quad \text{[Equation 1]}$$

Further, as to some samples, the wire was coiled third times, and Q at 200 MHz was measured by Network/Spectrum Analyzer 4195A made by Hewlett-Packard Company to obtain Q200. The results are shown in Tables 1A and 1B.

TABLE 1A

| Sample No. | Main components (mol %) | | | Additives (wt parts) | | | | | Baking temperature (° C.) |
|---|---|---|---|---|---|---|---|---|---|
| | $Fe_2O_3$ | NiO | CuO | $Bi_2O_3$ | MgO | $SiO_2$ | CoO | Talc | |
| 1 | 47.4 | 51.6 | 1.0 | 6.0 | 2.2 | 4.3 | 0.25 | | 1030 |
| 2 | 47.9 | 51.1 | 1.0 | 6.0 | 2.2 | 4.3 | 0.20 | | 1030 |
| 3 | 47.9 | 51.1 | 1.0 | 6.0 | 2.2 | 4.3 | 0.25 | | 1030 |
| 4 | 47.9 | 51.1 | 1.0 | 6.0 | 2.2 | 4.3 | 0.30 | | 1000 |
| 5 | 47.9 | 51.1 | 1.0 | 6.0 | 2.2 | 4.3 | 0.35 | | 1000 |
| 6 | 48.4 | 50.6 | 1.0 | 6.0 | 2.2 | 4.3 | 0.25 | | 1030 |
| 7 | 47.9 | 51.1 | 1.0 | 6.0 | | | 0.25 | 6.5 | 1030 |
| 8 (Comparative) | 47.4 | 51.6 | 1.0 | 2.0 | 0.7 | 1.3 | | | 1030 |
| 9 (Comparative) | 48.4 | 50.6 | 1.0 | 6.0 | 2.2 | 4.3 | 0.6 | | 1030 |
| 10 (Comparative) | 48.4 | 50.6 | 1.0 | 6.0 | 2.2 | 4.3 | 0.9 | | 1030 |

TABLE 1B

| Sample No. | Characteristics | | | | |
|---|---|---|---|---|---|
| | $\mu i$ | $\alpha\mu ir(-20\sim 20°$ C.) (ppm/° C.) | $\alpha\mu ir(20\sim 60°$ C.) (ppm/° C.) | $\Delta L/L$ (%) | $Q_{200}$ |
| 1 | 5.8 | −16.5 | −3.1 | −3.3 | 30 |
| 2 | 7.6 | −5.6 | −6.1 | −3.1 | 18 |
| 3 | 6.4 | −6.5 | −8.1 | −3.3 | 21 |
| 4 | 5.7 | −0.4 | −4.8 | −3.2 | 31 |
| 5 | 5.6 | −1.6 | −1.3 | −3.2 | 33 |
| 6 | 6.8 | −4.7 | −1.7 | −1.9 | 14 |
| 7 | 6.9 | −5.2 | −6.9 | −2.7 | 21 |
| 8 (Comparative) | 6.2 | +47.9 | +49.3 | −15.7 | 6 |
| 9 (Comparative) | 6.2 | +6.3 | +5.4 | −3.7 | 32 |
| 10 (Comparative) | 6.1 | +121.5 | +43.5 | −3.9 | 51 |

As is seen from Tables 1 and 2, with respect to the samples 1 to 7 within the range of the invention, in the temperature ranges of −20 to 20° C. and 20 to 60° C., the relative temperature coefficients $\alpha\mu ir$ of the inductance are all negative. The changing rate $\Delta L/L$ of the inductance is −5.0 or lower, and the good anti-stress characteristic is available. In contrast, if the composition ratios of $Bi_2O_3$, MgO and $SiO_2$ are below the range of the invention as the comparative example of the sample 8 and when CoO is absent, the relative temperature coefficient $\alpha\mu ir$ of the inductance is positive and not only the value is large but also the changing rate $\Delta L/L$ of the inductance is remarkably large, and the anti-stress characteristic is inferior. In the samples 9 and 10 where the composition ratio of CoO is above the range of the invention, the relative temperature coefficients $\alpha\mu ir$ of the inductance are positive.

As mentioned above, since the anti-stress characteristic is good and the change by compression of the inductance is small, the anti-stress characteristic is good and the change of the inductance by the resin molding is small correspondingly, so that the inductor small in the inductance tolerance is available.

What is claimed is:

1. A magnetic material comprising:
    main components including $Fe_2O_3$ of 46.0 to 51.0 mol %, CuO of 0.5 to 15.0 mol % and the rest being NiO; and
    additives including bismuth oxide of 4.0 to 10.0 wt parts in terms of $Bi_2O_3$, magnesium oxide of 1.0 to 5.0 wt parts in terms of MgO, silicon oxide of 2.0 to 8.0 wt parts in terms of $SiO_2$, and cobalt oxide of 0.2 to 0.5 wt parts in terms of CoO with respect to said main component of 100 wt parts.
2. The magnetic material according to claim 1,
    wherein said magnesium oxide and said silicon oxide of said additives are added 3.0 to 10.0 wt parts in terms of talc $[Mg_3Si_4O_{10}(OH)_2]$ with respect to said main component of 100 wt parts.
3. The magnetic material according to claim 1,
    wherein a relative temperature coefficient of an initial permeability in a temperature range between −20 and 20° C. and a temperature range between 20 and 60° C. is negative.
4. The magnetic material according to claim 1,
    wherein a rate of change in inductance during pressing at pressure of 50 kPa is within ±5%.
5. An inductor comprising a core made of a magnetic material, said magnetic material including:
    main components including $Fe_2O_3$ of 46.0 to 51.0 mol %, CuO of 0.5 to 15.0 mol % and the rest being NiO; and
    additives including bismuth oxide of 4.0 to 10.0 wt parts in terms of $Bi_2O_3$, magnesium oxide of 1.0 to 5.0 wt parts in terms of MgO, silicon oxide of 2.0 to 8.0 wt parts in terms of $SiO_2$, and cobalt oxide of 0.2 to 0.5 wt parts in terms of CoO with respect to said main component of 100 wt parts,
    wherein said core is molded with resin.
6. The inductor according to claim 5,
    wherein said magnesium oxide and said silicon oxide of said additives are added 3.0 to 10.0 wt parts in terms of talc $[Mg_3Si_4O_{10}(OH)_2]$ with respect to said main component of 100 wt parts.
7. The inductor according to claim 5,
    wherein a relative temperature coefficient of an initial permeability in a temperature range between −20 and 20° C. and a temperature range between 20 and 60° C. is negative.
8. The inductor according to claim 5,
    wherein a rate of change in inductance during pressing at pressure of 50 kPa is within ±5%.

* * * * *